United States Patent [19]

Bouldin

[11] Patent Number: 4,999,278
[45] Date of Patent: * Mar. 12, 1991

[54] TRANSMISSIVELY READ OPTICAL RECORDING MEDIUM

[75] Inventor: Eric W. Bouldin, Atherton, Calif.

[73] Assignee: Drexler Technology Corporation, Mountain View, Calif.

[*] Notice: The portion of the term of this patent subsequent to Jun. 28, 2005 has been disclaimed.

[21] Appl. No.: 386,389

[22] Filed: Jul. 27, 1989

Related U.S. Application Data

[60] Continuation-in-part of Ser. No. 210,527, Jun. 22, 1988, Pat. No. 4,884,260, which is a division of Ser. No. 39,507, Apr. 16, 1987, Pat. No. 4,753,864.

[51] Int. Cl.$^5$ .................... G03C 1/035; G03C 1/06
[52] U.S. Cl. .................... 430/270; 430/273; 430/495; 430/567; 430/569; 430/945
[58] Field of Search .............. 430/270, 273, 495, 945, 430/567, 569; 346/135.1

[56] References Cited

U.S. PATENT DOCUMENTS

| | | | |
|---|---|---|---|
| 4,239,338 | 12/1980 | Borrelli et al. | 430/502 |
| 4,269,917 | 5/1981 | Drexler et al. | 430/16 |
| 4,278,756 | 7/1981 | Bouldin et al. | 430/414 |
| 4,314,260 | 2/1982 | Drexler | 346/76 |
| 4,396,701 | 8/1983 | Bouldin | 430/271 |
| 4,509,161 | 4/1985 | Van de Leest et al. | 430/321 |
| 4,753,864 | 6/1988 | Bouldin et al. | 430/273 |
| 4,762,770 | 8/1988 | Bouldin et al. | 430/273 |
| 4,837,134 | 6/1989 | Bouldin et al. | 430/445 |
| 4,884,260 | 11/1989 | Bouldin et al. | 430/275 |

FOREIGN PATENT DOCUMENTS 76068 1/1980 Japan.

*Primary Examiner*—Paul R. Michl
*Assistant Examiner*—Lee C. Wright
*Attorney, Agent, or Firm*—Thomas Schneck; Dale Molberg

[57] ABSTRACT

A transmissively read light beam sensitive recording medium is disclosed having a thin layer of irregularly shaped spheroidal silver grains which are capable of being modified by a light beam into smoothly rounded spherical silver grains. Portions of the thin layer which contain the irregularly shaped grains are highly absorptive of light, while portions of the layer which have been modified are transmissive. Also disclosed are methods for creating said medium.

34 Claims, 2 Drawing Sheets

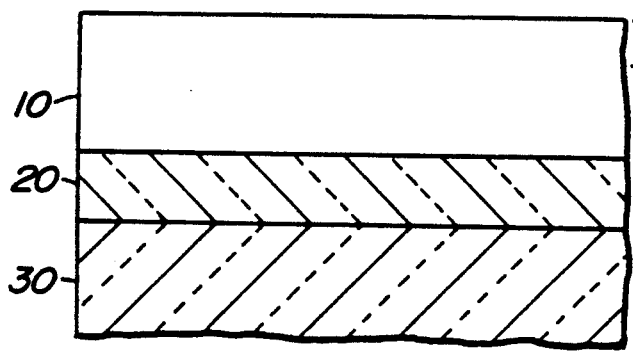
FIG._1
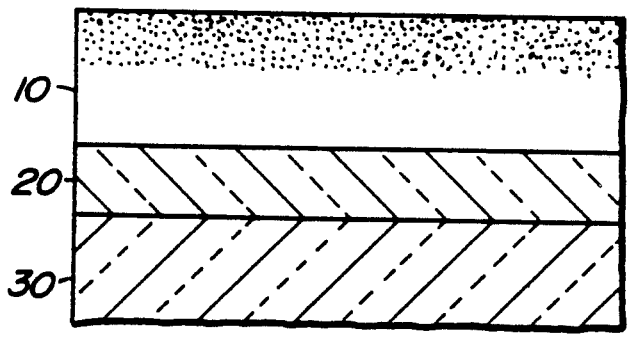
FIG._2
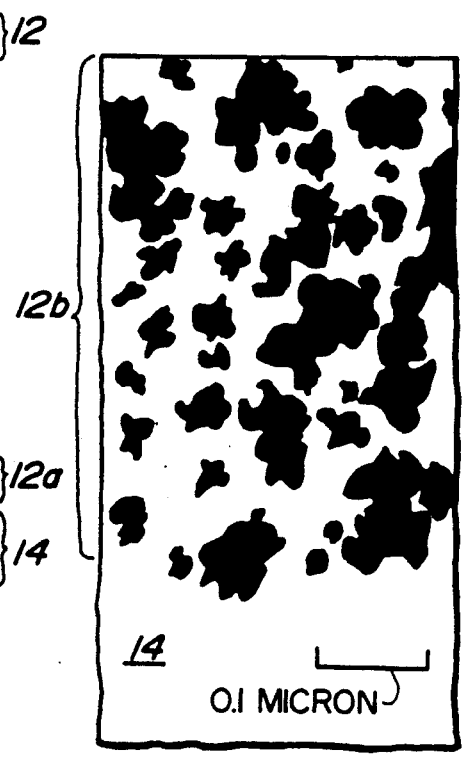
FIG._3A
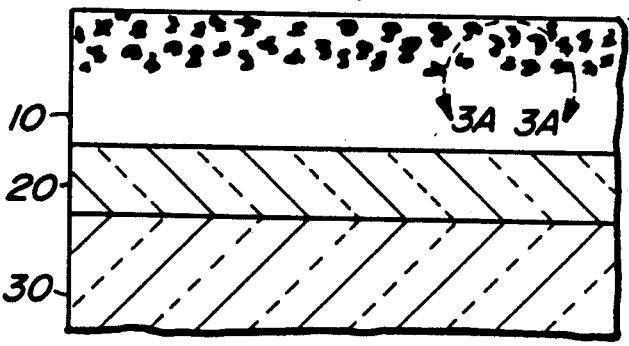
FIG._3
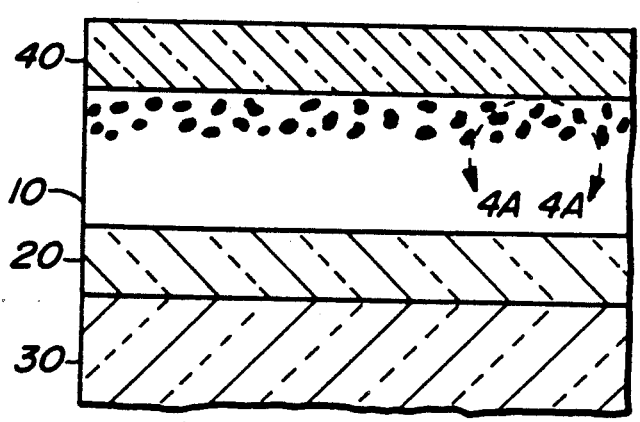
FIG._4
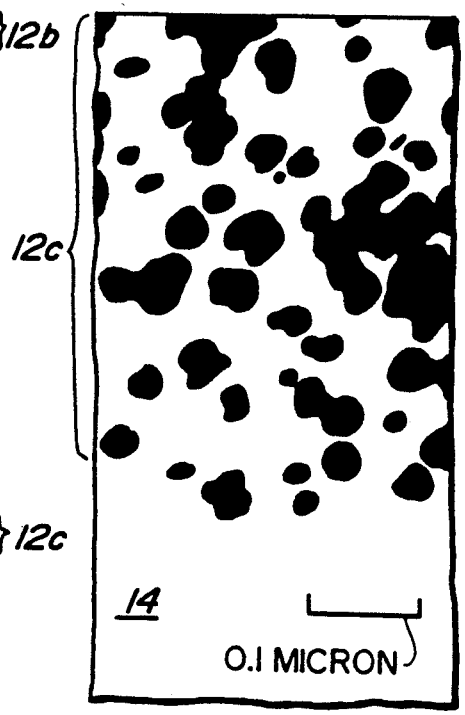
FIG._4A

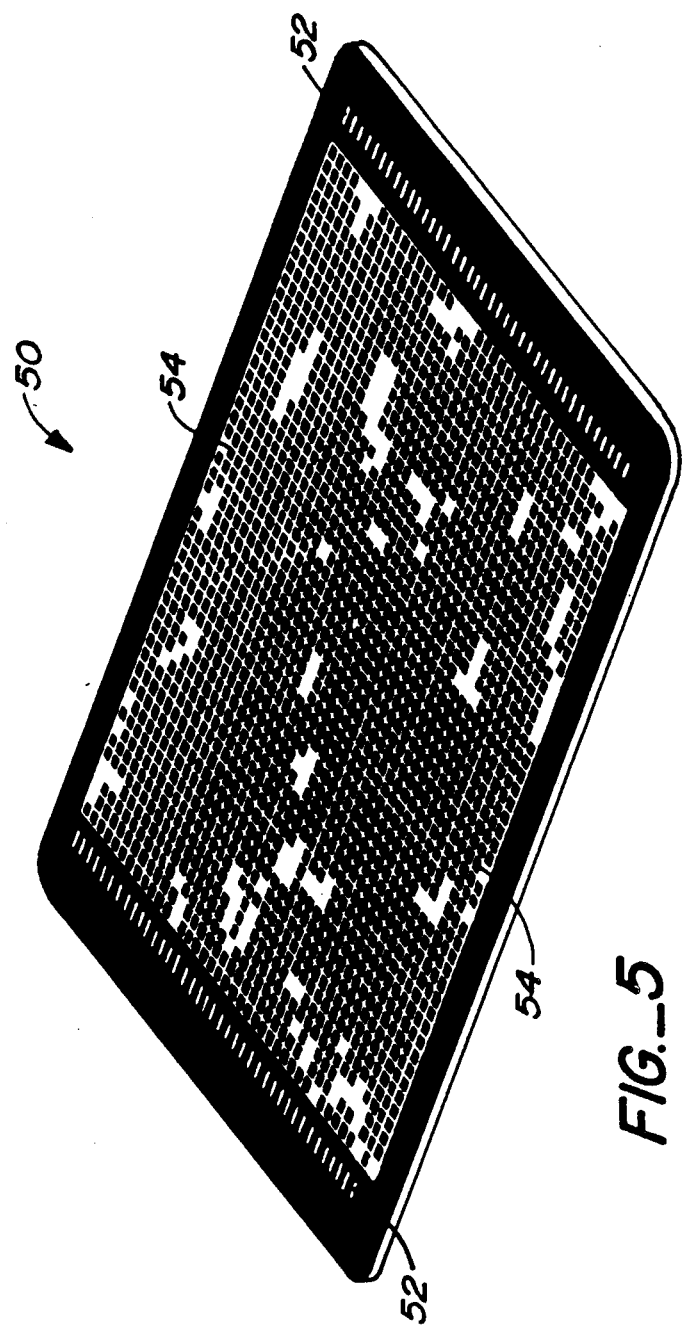
FIG._5

TRANSMISSIVELY READ OPTICAL RECORDING MEDIUM

CROSS-REFERENCE TO RELATED APPLICATION

This application is a continuation-in-part of application Ser. No. 07/210,527, filed June 22, 1988, now U.S. Pat. No. 4,884,260, which is a divisional of application Ser. No. 7/039,507, filed Apr. 16, 1987, now U.S. Pat. No. 4,753,864.

DESCRIPTION

1. Technical Field

The present invention relates to optical recording media read by light transmission.

2. Background Art

Many types of optical recording media have been developed for laser writing which are read by reflection or transmission. Some of these media require post write processing before they can be read and some can be read immediately after laser writing. The media which can be read directly after writing are of particular interest. These media are commonly known as DRAW media, for their "direct read after write" capability.

One of the most commonly known types of laser DRAW media have thin metal films disposed on a substrate. Holes which are melted in the metal films by a laser can be read either by reflection or transmission. Vacuum sputtering is one of the methods used to form the metal films.

Laser sensitive media that are transmissively read after laser melting and local contraction of a thin metallic film are suitable for recording digital data. An example of such a media was described in Japanese Patent Laying Open 4724/1980.

These media are less suitable for the recording of continuous alphanumeric or graphic information made up of laser written spots. The reason for this degraded performance lies in the recording mechanism of the thin film. The laser written hole will invariably have a lip made up of the metal that has contracted under surface tension from the center of the hole as it was melted. In writing a larger image made up of discrete holes, the melted metal will not all flow uniformly to the edges o the images. Rather, some of the metal will flow into what was meant to be a cleared out image resulting in grainy, noisy or "fogged" image.

Organic dye polymers are also used extensively in laser recording but rarely in transmissive mode. Like metallic thin film media, they would face the same difficulty in writing continuous alphanumeric or graphic data made up of laser written spots because of material flow. Both metallic thin films and dye-polymer media are utilized in laser recording systems which are predominantly read in reflection. Tracking and control indicia are stamped into the substrate over which these media lie, and function by a quarter wavelength interference of the reflective read beam. Tracking and control indicia cannot easily be formed in metallic thin film or dye polymer media which are to function in a transmissively-read mode.

A method for forming a laser recordable reflective metal film using a fine grain photo emulsion was first disclosed by J. Drexler in U.S. Pat. No. 4,314,260. In this patent, a processed black filamentary silver emulsion is converted to reflective non-electrically conductive recording medium by heating the emulsion in an oxygen containing atmosphere until the surface develops a reflective appearance. The resulting medium is read by reflection.

Laser recording media formed from silver-halide emulsions requiring no heating have also been developed. In U.S. Pat. No. 4,269,917 to E. W. Bouldin and J. Drexler, a reflective silver layer is created at a surface of a photosensitive silver-halide emulsion by a silver diffusion transfer negative photographic process. This patent also teaches that control indicia such as servo track guides can be photographically recorded on the media during manufacture. Areas of black-appearing silver can be laid down as address indicia or servo track guides with subsequent development of the reflective laser recording material between the tracks. The address indicia and servo track guides are read in reflection as are the laser written holes which occur as light-scattering pits in the reflective silver surface.

In co-pending application Ser. No. 07/210,257 filed June 22, 1988, by E. W. Bouldin and J. Drexler, a laser sensitive media capable of pre-recording of control indicia was formed from a photographic emulsion in a process which does not involve silver diffusion transfer. Again this media is read in reflection.

The recording medium, disclosed in the above application, is a material layer having a thin black upper crust of irregularly shaped oblong silver particles forming a dark field with a clear underlayer below which a thin reflective metallic layer is disposed. The thin dark crust is highly absorptive to laser light so that modification, displacement, and/or agglomeration of the silver particles in the crust by laser light reveals the shiny reflective metallic underlayer. It was found that a laser beam could modify the irregular shape of the oblong silver particles to that of smooth spheroids with reduced covering power. The dark crust of irregularly-shaped silver particles is created from a photosensitive silver chloride emulsion that is activated by exposure to actinic radiation and then developed with a slow diffusing developer such as tertiary butylhydroquinone or with a viscous developer.

An object of the present invention was to devise a DRAW laser recording medium that is read transmissively, is prerecordable by photographic means and can be used to record both digital data and continuous indicia such as text and graphics.

A further object of the invention was to provide a laser sensitive recording medium which is nonphotosensitive in full sunlight and which provides for stable data storage in a wide range of environmental conditions. Another object was to devise a transmissive laser recording and optical data storage medium which could be fabricated from a silver-halide emulsion at low cost and with few processing steps.

SUMMARY OF THE INVENTION

The above objects have been met with the discovery that nearly all of the silver in a photosensitive, silver-halide emulsion can be precipitated out near a surface of the emulsion in a thin layer of irregularly shaped spheroidal grains, which give the layer good covering power, and that the irregularly shaped spheroidal grains can be modified by a light beam into smooth spheroidal grains with greatly reduced covering power. Specifically a novel process was found which created a very thin layer of nearly one hundred percent irregularly shaped spheroidal silver grains from a silver halide emulsion. The process begins with a very thin emulsion layer of fine grained photosensitive-halide that is exposed to actinic radiation to create a latent image composed of silver precipitating nuclei. Silver chloride emulsions are preferred because of their tendency to form irregularly-shaped spherical grains in subsequent development. The exposed and nucleated layer begins development when it is placed in a monobath solution containing a high level of sulfite. The result of this process is a very thin layer of irregularly-shaped spheroidal silver grains with average diameters less than 0.1 micron. This very thin layer of irregularly-shaped spheroidal silver grains is highly absorptive of visible light even though the diameters of the silver grains are less than one-half the wavelength of light in the visible spectrum. It was discovered that these irregularly-shaped spheroidal silver grains could be modified by a laser beam into smooth spherical silver grains which produced in the thin layer a greatly reduced covering power, or in other words an increased transmissivity.

Portions of the very thin surface layer which contain substantially the irregularly-shaped spheroidal silver grains provide the surface layer with a typical white light optical density of 1.6. In the areas of the surface layer where the irregularly-shaped silver grains have been modified to the smooth spherical silver grains, the surface layer has a typical white light optical density of 0.85. Therefore, areas of the irregularly-shaped grains have a transmissivity of 2.5 percent while the smooth spherical grains have a transmissivity of 14 percent. This gives a transmissive contrast ratio between these two areas of 1:6. Optical contrast ratios of 1:1.2 are sufficient for reading, however a contrast ratio of 1:2 or greater is preferred. The thickness of the surface layer of silver grains is less than 1.0 micron and preferably within the range of 0.5 to 0.75 micron.

An advantage of the above laser recording medium is that both continuous indicia and digital data may be recorded and stored directly on the medium. In this recording mechanism, the sensitive layer is not displaced en masse as is the case with thin metallic films or dye polymer layers. Rather, microchanges in the morphology of the silver grains produce an area of increased transmissivity without a build-up of material at the edge of the written area. In this way, images made up of many laser written holes can be made without the problem of displaced melted material finding its way into the written image. Another advantage results because the starting material of this invention is a photographic emulsion, on which pre-recorded information such as address and sector marks, tracking lines, etc. can be easily incorporated during manufacture by use of a photomask and subsequent chemical development of the imaged areas. Further, slow diffusing developers need not be used in the present method for making the medium.

BRIEF DESCRIPTION OF THE DRAWINGS

FIG. 1 is a side sectional view of the starting material for the recording medium of the present invention.

FIGS. 2-4 are detailed side sectional views of the recording medium of FIG. 1 showing the results of different combinations of processing steps for making the finished recording medium.

FIGS. 3A and 4A are blown up views of the recording medium taken along lines 3A and 4A and shown in FIGS. 3 and 4 respectively.

FIG. 5 is a plan view of a microfiche made from the resultant recording medium of FIGS. 1-4.

BEST MODE FOR CARRYING OUT THE INVENTION

A. Starting Material

The starting material, shown in FIG. 1, for making the transmissively read laser recording and optical data storage medium is a silver-halide emulsion layer 10 held in a colloid matrix, typically gelatin. The emulsion layer 10 is supported on a transparent flexible substrate 30. An optional clear subbing layer 20 may be disposed between the emulsion layer and the substrate. The emulsion layer 10 should be without an overcoat and should be characterized by uniform or monodisperse fine grain size and uniform thickness. The term monodisperse means to have a size distribution with less than a 25% coefficient of variance. Typical overall thickness is less than 10 microns and 2 microns is preferred. The size of the silver-halide grains should be less than 5 to 10 percent of the smallest recording dimension for best results. Silver-halide emulsion photoplates and films using Lipmann emulsions have grain sizes primarily under 0.05 micron. Preferably the silver-halide grains are equally distributed in a very thin layer 12, between 0.5 and 0.75 microns thick, at a surface of the emulsion.

Silver chloride emulsions are preferred because of their tendency to form spherical grains with the developer disclosed below, however, silver bromide emulsions may also serve as the starting material. It was found through transmission electron microscopy that development of silver bromide emulsions produced filamentary silver grains which do not respond in the same way to a recording laser as the roughly- or irregularly-shaped spherical silver grains. Nevertheless, with a few processing steps the silver bromide emulsion can be converted to one containing silver chloride in the following manner: the silver bromide emulsion is exposed to a photolithographic mask; the above emulsion is developed and fixed which forms reduced silver filaments and leaves a patternwise formatting of control and sector marks; the reduced silver filaments of the pattern formatting are then immersed in a solution of oxidizing agent in the presence of chloride ions. The reduced silver is oxidized back to silver ions and instantly precipitated as silver chloride. Further development can now proceed as if one had begun originally with the silver chloride emulsion.

One advantage of this path to a laser recording medium is that silver-bromides are inherently more sensitive to light in the photolithographic pre-formatting step than are silver chlorides. Greater sensitivity allows for a shorter exposure time for the pre-formatting and thus higher throughput in production. Another advantage to this mode of processing is that the irregularly shaped silver grains resulting from the conversion of silver bromide to chloride (in subsequent development) are smaller than those achieved straight from a starting silver chloride emulsion. Smaller grain size could mean a lower noise level in the medium. The oxidizing solution of this bromide conversion process can be any compound so placed in the electrochemical series to oxidize metallic silver when in a proper concentration or at proper pH. Examples would include dichromate ion, ferricyanide ion and cyanate or ferric ion. The chloride component can be present as an ion from a salt or from hydrochloric acid as long as the oxidizing component is acid compatible.

B. Nuclei Formation

The first step in the process of making the present invention is the creation of latent image nuclei within the starting emulsion. Nuclei may be created by exposure of the silver-halide photosensitive layer 12 to actinic radiation. This initial exposure is saturating, activating the entire thickness of the silver-halide emulsion which is exposed to light. This activation produces nuclei which are silver precipitating sites and which are illustrated as a uniform distribution in a horizontal plane of black dots in FIG. 2, forming a nucleated surface layer 12a which is within the emulsion layer and which is clearly defined. This surface layer 12a has a distinct lower boundary because the unexposed silver halide grains are evenly distributed in a thin layer within the starting emulsion. After exposure the density of nuclei is generally uniform throughout the thin layer. A clear underlayer 14 is directly beneath the nucleated surface layer 12a separating the nucleated layer from the substrate 30 and the subbing layer 20.

The initial exposure may be obtained from room light or from a brief exposure to an intense source of actinic radiation. Alternatively, chemical fogging may be used in place of actinic radiation. Actinic radiation is the generic term which describes any exposure which creates a latent image. Latent image is the term which describes activation of unexposed silver halide. Exposure of the silver-halide photosensitive emulsion may be of uniform intensity over the surface of the emulsion, as illustrated by the nuclei pattern in the emulsion layer in FIG. 2. This would yield a uniform areawise density of the latent images within the photosensitive medium.

An alternative to a uniform exposure and thus a uniform density of latent images is a patterned exposure of variable intensity. For example, exposure of the silver-halide photosensitive emulsion may be composed of a pattern of high and low intensity actinic radiation over the surface of the photosensitive emulsion. By changing the intensity of the exposure in a patterned fashion, by means of a shielding mask having two degrees of transmissivity to the actinic radiation, the density of the latent images within the photosensitive emulsion will differ in proportion to the intensity of the exposure levels. By patterning this differential exposure with higher and lower density latent images, it is possible to create a pattern of two different light absorptivities, which with further processing known in the art form transmissive pre-recorded formatting having an optical density of 0.2 or less and recording areas having an optical density of at least 1.0. The pre-recorded formatting may include certain information, such as alignment and sector marks.

The supporting substrate 30 may be either glass or a flexible polymer web. A polyester web is preferred, although polycarbonate and other like materials may be used. It is necessary that this supporting substrate 30 be transparent to the radiation produced by the optical reading device. The substrate should have a flat major surface on which the emulsion layer 10 resides. While flatness is preferred, it is not essential.

C. Physical Development of Nuclei

The second step of the present invention involves contacting the nucleated emulsion layer with a monobath having a photographic developer in combination with a sulfite anti-oxidant which also acts as a weak silver-halide solvent. The procedure may be carried out in room light, except where prerecording of information is desired. In the latter case, monobath development should take place in darkness. Contact may be by immersion of the emulsion in the tank containing monobath. In this manner, the emulsion surface distal to the substrate receives maximum monobath contact.

A preferred monobath formulation includes a developing agent in combination with sulfite. The developing agent should have a redox potential sufficient for causing silver ion reduction on silver nuclei. The concentration of the developing agent and the pH of the monobath should not cause filamentary silver growth, but should rather develop silver particles that have an irregular spheroidal shape with average diameters less than 0.1 micron. The diameter of a grain means the diameter of a circle having an area equal to the projected area of the grain as viewed in a photomicrograph of an emulsion sample. Average diameter means the cumulative average of the diameters of all the grains. Preferably the average diameter of the silver particles fall within the range of 0.03 and 0.07 micron. It was found that high levels of sulfite in the monobath encourage the development of irregularly-shaped spheroidal silver grains. A concentration of between 75 and 200 grams of sulfite per liter of monobath is preferred. The temperature of the monobath may be near room temperature or slightly elevated to shorten developing time and increase throughput during production.

The monobath treatment is carried out until nearly all of the reduced silver ions are precipitated on the nuclei and little or no undeveloped silver remains in the emulsion. Full development of the silver may be accomplished in the monobath in just a few seconds or less. In some situations though a longer time may be required for complete development. Development of the silver results in a layer 12b of uniformly dispersed irregular spheroidal silver particles located near the emulsion surface distal to the substrate, shown in FIG. 3. As stated previously, this layer 12b is preferably between 0.5 micron and 0.75 microns thick.

After the monobath treatment the emulsion may be "fixed" in a thiosulfite solution to remove unreacted silver halide from the non-imaged areas. The film is then coated with a thin radiation cured overcoat 40, shown in FIG. 4, for protection against scratches and finger prints.

D. Mode of Use

The resulting thin coating on the substrate is suitable for laser recording, for example, using a diode or noble gas laser. Layer 12b, as previously described, comprises a very thin layer of irregularly-shaped spheroidal silver grains. It was discovered that a laser beam could modify the irregularly-shaped spheroidal silver grains into more rounded and smooth spherical silver grains. The mechanism for this modification of the silver grains is not presently fully understood. Nevertheless, a modification has been observed by electron microscopy and is represented in FIGS. 3 and 4. FIG. 3 shows the layer 12b of irregularly-shaped spheroidal silver grains and FIG. 4 shows a layer 12c of silver after laser recording wherein the silver grains have been modified into smooth spheroids. The surface of the irregularly-shaped spheroidal grains may be characterized as being rough and the surface of the laser modified grains as being smooth. FIGS. 3A and 4A, which are drawn from photomicrographs of the two types of silver grains, clearly show the difference in the shape and morphology of the two types of silver grains. The modification of the silver grains by the laser beam appears to have little or no effect on the average diameter of the grains, but there is an accompanying decrease in surface to volume ratios. It follows that with a decrease in surface to volume ratios, the projected area of the grains would also decrease. However, the decrease in projected area is relatively small and does not account for the significant increase in transmissivity of the modified silver grains.

Before laser recording on the medium, a thin transparent overcoat 40 is placed over the developed emulsion layer to prevent blistering. A one millimeter thick electron beam cured acrylic overcoat has proven suitable for this purpose. To record digital data the recording laser may be rapidly pulsed "on" and "off" as it scans across the medium forming very small data spots in the medium, which are read by transmission. Continuous indicia, such as bar codes, text and graphics, may also be written on the medium. In the latter case the laser is kept "on" while the beam is directed onto the surface of the medium. Alternatively, a pulsed beam may be used to create side by side spots which form continuous indicia. Since the transmissivity of the layer containing mostly the modified grains is greatest for red light, data and indicia written in the medium will appear amber when read with a white light source.

Samples of the present medium having pulsed laser-recorded alphanumeric data in the form of letters (40 um high) were readily legible in commercially available microfilm readers. Hard copy magnified output of the laser-written letters was produced from microfiche reader printers manufactured by Anacomp Inc. and Canon Inc.

Presently the upper and lower limits of the amount of light energy required to produce the desired modification of the silver grains are unknown. However it has been shown that focused sunlight will also cause the desired modification, therefore the light beam need not be coherent. The light beam should not pit or create topographic changes to the medium. Rather, if the surface of the medium is flat, it should remain flat in accord with the invention. Tests using a four milliwatt diode laser having a 4 micron diameter beam with a wavelength of 805 nanometers have been conducted by the assignee of this invention. A level of 400 mJ/cm$^2$ produced the desired modification. It is expected that higher powered lasers with wider beams may be used to increase the recording speed. Flash recording through a mask may also be possible.

The above-described recording medium is of particular interest in the fields of microfilm, personal data cards and optical elements. The present laser recording and data storage medium is particularly suited for microfiche where high speed recording is not required. In FIG. 5 a microfiche 50 is shown containing the light beam sensitive recording medium described above. The microfiche 50 has standard dimensions of 4×6 inches (10×15 cm.) and contains prerecorded sector and alignment guides 52. Dark areas 54 are recording areas on which optical recordings may be made, such as text and graphics. Microfiche 50 has the advantage of being "in the field" appendable. That is that information can be added to the microfiche in the field by a laser, since no subsequent processing is required to read the added information. Potential uses include immediate microfiche recording, duplicating and archival recording of data from diagnostic clinical tests, oil and gas well fields, satellite transmissions and other such data-intensive sources. A characteristic of the present medium is that full sunlight does not affect the medium except when focused with a magnifying glass or the like. Duplication of a microfiche with this medium may be accomplished with conventional contact printing apparatus using white light. Moreover, the medium is stable in a wide range of humidities and temperatures. These characteristics provide for a highly desirable archival-type microfiche.

A data card containing the present recording medium would benefit from its characteristics in much the same way as a microfiche. For example, a data card could contain a person's complete medical history written in both machine readable form (for data security) and eye readable form (for emergency use). This history could be periodically updated as conditions change. Handheld transmissive data card readers are commercially available at low cost and could be economically used by emergency personnel to ascertain important medical information about someone whom they are treating.

Since the light beam-modified medium exhibits greater transmissivity to red light, the medium could function as an optical filter or optical element coating. For example, a very fine red light diffraction grating could be obtained with this medium. Other optical elements may also be made with the present medium.

I claim:

1. A transmissively read, optical recording medium comprising,
    a colloid matrix layer having a surface layer with a uniform thickness, the surface layer formed by irregular spheroidal silver grains having an average diameter less than 0.1 micron and being capable of modification with a light beam into smooth spherical silver grains having substantially the same average diameter as the irregular spheroidal silver grains but with a substantially reduced covering power than the irregular spheroidal silver grains before light beam modification.

2. The medium of claim 1 further comprising a thin, flexible, transparent overcoat disposed over said surface layer.

3. The medium of claim 2 wherein said overcoat is cured by one of ultraviolet radiation and electron beam radiation.

4. The medium of claim 3 wherein said overcoat is 10 to 75 microns thick.

5. The medium of claim 1 wherein said irregular spheroidal and said smooth spherical silver grains have average diameters within the range of 0.03 and 0.07 micron.

6. The medium of claim 1 wherein portions of said surface layer containing substantially said irregular spheroidal silver grains have a transmissivity contrast ratio of at least 1:1.2 with portions of said surface layer containing substantially said light beam modified smooth spherical silver grains.

7. The medium of claim 1 wherein portions of said surface layer containing substantially said irregular spheroidal silver grains have a white light optical density of at least 1.2 and portions of said surface layer containing substantially said light beam smooth spherical silver grains have a white light optical density of 0.9 and less.

8. The medium of claim 1 wherein portions of said surface layer containing substantially said smooth spherical silver grains show an increased transmissivity for red and near infrared light compared to the transmissivity of said irregular spheroidal grains.

9. The medium of claim 1 wherein said uniform thickness of said surface layer is not more than 1.0 micron thick.

10. The medium layer of claim 1 wherein said uniform thickness of said surface layer is within the range of 0.50 and 0.75 micron.

11. The medium of claim 1 wherein said colloid matrix comprises a clear gelatin.

12. A transmissively read, optical recording medium comprising,
   a colloid matrix layer having a surface layer with a thickness of not more than 1.0 micron, the surface layer formed by first and second type spheroidal silver grains having average diameters of not greater than 0.1 micron, the first type of spheroidal silver grains having a rough surface and the second type of spheroidal silver grains having a smooth surface, the first type of silver grains being capable of being modified by a light beam into the second type of silver grains, portions of the surface layer containing substantially the first type of silver grains being substantially less transmissive to a read beam than portions of the surface layer light beam modified to contain substantially the second type of silver grains.

13. The medium of claim 12 further comprising a flexible transparent overcoat having a thickness of between 10 and 75 microns.

14. The medium of claim 12 wherein said first and second types of spheroidal silver grains have average diameters within the range of 0.03 and 0.07 micron.

15. The medium of claim 12 wherein said portions of said surface layer containing substantially said first type of silver grains has a read beam transmissivity contrast ratio of at least 1:2 with said portions of said surface layer containing substantially said second type of silver grains.

16. The medium of claim 12 wherein said portions of said surface layer containing substantially the first type of spheroidal silver grains have a red light optical density of at least 1.0, and said portions of said surface layer containing substantially the second type of spheroidal silver grains have a red light optical density of 0.85 and less.

17. The medium of claim 12 wherein said uniform thickness of said surface layer is within the range of 0.50 and 0.75 micron.

18. The medium of claim 12 wherein said colloid matrix comprises clear gelatin.

19. A light beam sensitive photographic element containing the medium of claim 1.

20. The light beam sensitive photographic element of claim 19 wherein said element includes one of a microfiche and a wallet-size data card.

21. A light beam sensitive photographic element containing the medium of claim 12.

22. The light beam sensitive photographic element of claim 21 wherein said element includes one of a microfiche and a wallet-size data card.

23. A spheroidal silver grain of a first type that has an irregular shape with a non-smooth surface, the first type of spheroidal silver grain having a light beam induced capability for modification into a spheroidal silver grain of a second type having a smooth spherical shape with a generally smooth surface, the first and second types of silver grain having a diameter of not greater than 0.1 micron.

24. The silver grain of claim 23 wherein said silver grain of the first and second types has a diameter within the range of 0.03 to 0.07 micron.

25. The silver grain of claim 23 wherein said first type of silver grain is prepared by treating a silver halide grain having a diameter of not greater than 0.05 micron.

26. The silver grain of claim 25 wherein said silver halide grain is selected from the group consisting of silver chloride and silver bromide.

27. A method of making a transmissively read, optical recording medium comprising the steps of,
   forming a layer of silver precipitating nuclei in a monodispersed, photosensitive silver-halide emulsion layer having very fine grains having an average size of approximately 0.05 micron, the emulsion layer having a uniform thickness, and
   contacting the nucleated emulsion layer with a monobath solution containing a high level of sulfite whereby irregular shaped spherical silver grains are formed having an average diameter less than 0.1 m.

28. The method of claim 27 further comprising the step of providing a radiation cured overcoat over said monobath contacted emulsion layer.

29. The method of claim 27 whereby said silver-halide emulsion layer contains silver chloride.

30. The method of claim 27 whereby said nuclei layer is formed by exposure to light.

31. The method of claim 27 wherein said step of contacting said nucleated emulsion layer lasts between 2 seconds and 2 minutes.

32. The method of claim 27 wherein said monobath solution is maintained between the temperatures of 15° and 40° C.

33. The method of claim 27 wherein said level of sulfite in said monobath solution is within the range of 75 and 200 gr. per liter.

34. The method of claim 27 further comprising the step of fixing said monobath treated emulsion in a thiosulfite solution.

* * * * *